(12) United States Patent
Casper et al.

(10) Patent No.: US 6,845,424 B2
(45) Date of Patent: Jan. 18, 2005

(54) MEMORY PASS-BAND SIGNALING (75) Inventors: Bryan K. Casper, Hillsboro, OR (US); Shekhar Y. Borkar, Beaverton, OR (US); Stephen R. Mooney, Beaverton, OR (US); Aaron K. Martin, Hillsboro, OR (US); Joseph T. Kennedy, Beaverton, OR (US); Matthew B. Haycock, Beaverton, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 10/062,034

(22) Filed: Jan. 31, 2002

(65) Prior Publication Data
US 2003/0145162 A1 Jul. 31, 2003

(51) Int. Cl.[7] ............................................. G06F 12/00
(52) U.S. Cl. ..................................... 711/105; 711/167
(58) Field of Search ................................. 711/105, 167

(56) References Cited

U.S. PATENT DOCUMENTS 4,885,587 A  * 12/1989  Wiegand et al. ............... 324/14
6,185,149 B1 *  2/2001  Fujioka et al. ............... 365/233
6,530,006 B1 *  3/2003  Dodd et al. ................... 711/167
6,556,505 B1 *  4/2003  Tojima et al. ................ 365/233

OTHER PUBLICATIONS

Crisp, Richard, et al.,"Development of Single–Chip Multi–GB/s DRAMs", *1997 IEEE International Solid–State Circuits Conference*, (1997), 226–227, 461.

* cited by examiner

*Primary Examiner*—Hiep T. Nguyen
(74) *Attorney, Agent, or Firm*—Schwegman, Lundberg, Woessner & Kluth, P.A.

(57) ABSTRACT

A memory system provides includes multiple memory devices or banks of memory devices that are assigned frequency pass-bands. Each memory device includes frequency translation circuitry to up-convert and down-convert data signals to and from the assigned frequency pass-band. Some embodiments include simultaneous bidirectional communications between memory devices and a controller by assigning multiple frequency pass-bands to each memory device or bank of memory devices. A memory system substrate is provided with bandpass filters between memory device footprints and other device footprints.

28 Claims, 9 Drawing Sheets

MEMORY PASS-BAND SIGNALING

FIELD

The present invention relates generally to communications in electronic systems, and more specifically to communications with memory systems.

BACKGROUND

Modern electronic systems are placing ever-increasing demands on memory systems. As a result, the speed at which memory devices can communicate data is becoming increasingly important. The speed that memory devices can communicate data is often referred to as "memory bandwidth."

Known methods for increasing memory bandwidth include increasing the operating frequency of the memory devices and increasing the number data lines to the memory device. Increasing the operating frequency is a challenge because timing margins become smaller and more difficult to manage. For example, the effects of clock skew and jitter become more pronounced as operating frequency is increased. Increasing the number of data lines requires a corresponding increase in the size of the external interface on the memory devices, as well as more physical traces on the circuit board that includes the memory devices. For a more in-depth discussion of these problems, see Richard Crisp et al., "Development of Single-Chip Multi-GB/s DRAMS," IEEE International Solid-State Circuits Conference, Feb. 7, 1997.

For the reasons stated above, and for other reasons stated below which will become apparent to those skilled in the art upon reading and understanding the present specification, there is a need in the art for methods and apparatus to increase memory bandwidth.

DESCRIPTION OF EMBODIMENTS

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Various embodiments of the present invention provide for increased memory bandwidth by allowing memory devices and controllers to simultaneously communicate on the same signal lines. According to some embodiments, each memory (or bank of memories) is assigned one or more frequency pass-bands for communications, and controllers communicate with different memories using the appropriate pass-band(s). Because the same signal lines are used for simultaneous communications with multiple memory devices, memory bandwidth is increased.

Figure 1:
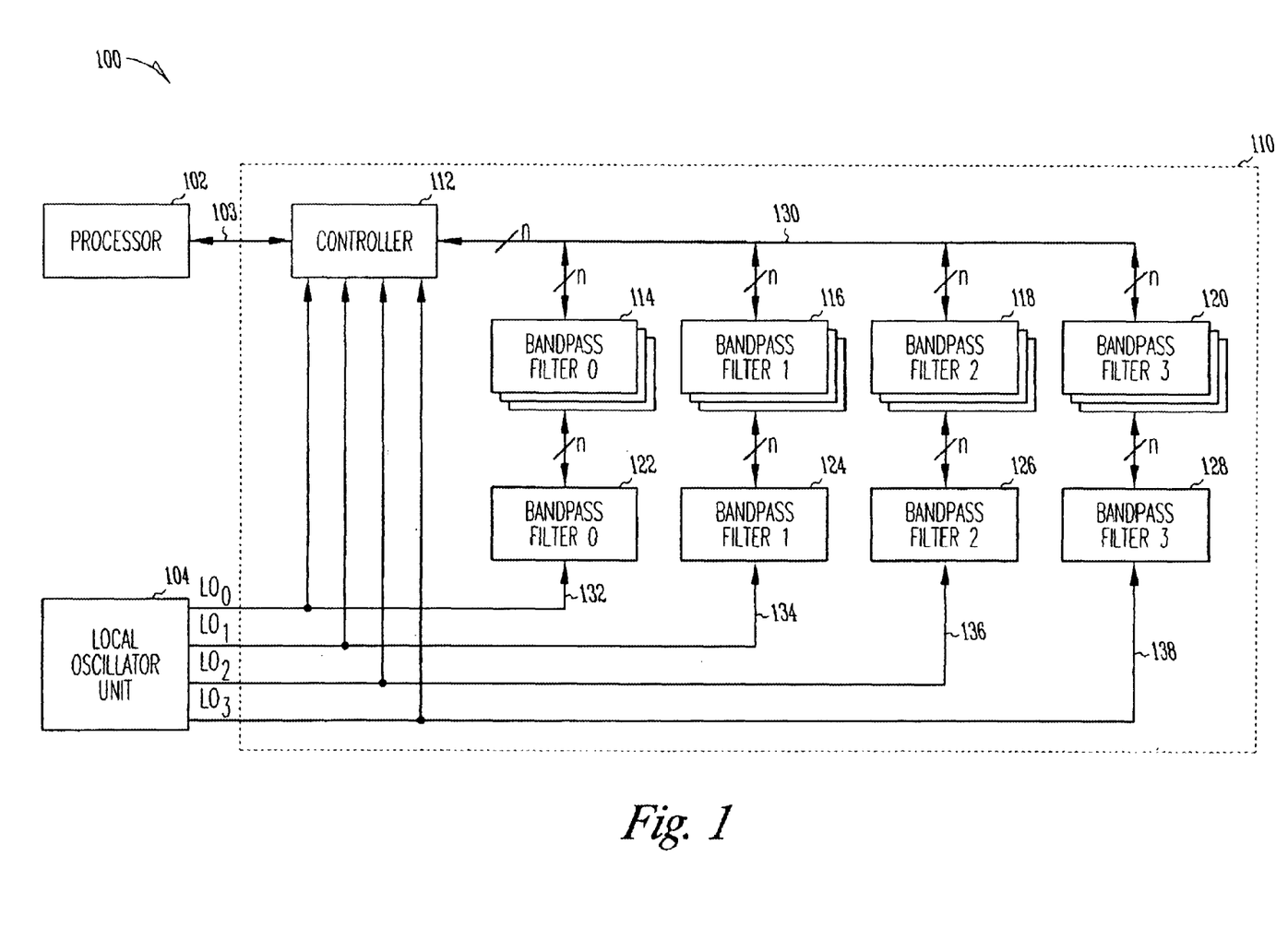
FIG. 1 shows an electronic system with memory pass-band signaling.

FIG. 1 shows an electronic system with memory pass-band signaling. System 100 includes processor 102, local oscillator unit 104, and memory system 110. Processor 102 communicates with memory system 110 on node 103, and local oscillator unit 104 communicates with memory system 110 on nodes 132, 134, 136, and 138.

Memory system 110 includes controller 112, memory devices 122, 124, 126, and 128, and bandpass filters 114, 116, 118, and 120. Controller 112 communicates with each memory device through one or more bandpass filters on bus 130. Bus 130 is shown as "n" bits wide to indicate that any number of conductors can be utilized to provide a communication path between controller 112 and memory devices 122, 124, 126, and 128. Each conductor included in bus 130 electrically couples controller 112 with the various bandpass filters.

Each memory device can simultaneously communicate with controller 112. This is accomplished in part by each memory transmitting and receiving data in a frequency pass-band, or "memory pass-band signaling." For example, referring now to FIG. 2, frequency pass-band 210 is used for communications between controller 112 and memory device 122; frequency pass-band 220 is used for communications between controller 112 and memory device 124; frequency pass-band 230 is used for communications between controller 112 and memory device 126; and frequency pass-band 240 is used for communications between controller 112 and memory device 128. By utilizing pass-band signaling, bus 130 can be simultaneously used for communications between controller 112 and each of the memory devices.

Figure 2:
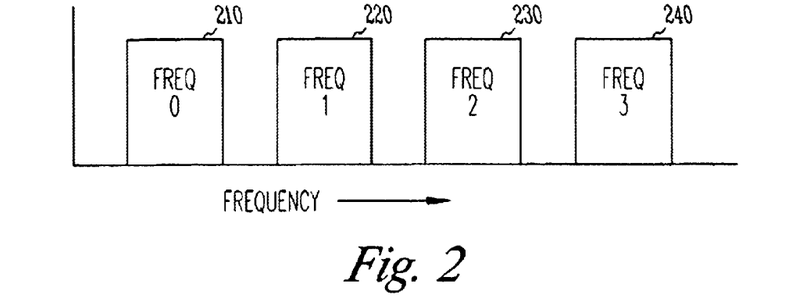
FIG. 2 shows frequency pass-band assignments for the electronic system of FIG. 1.

Referring now back to FIG. 1, bandpass filter 114 has a pass-band characteristic that matches frequency pass-band 210 (FIG. 2). In some embodiments, bandpass filter 114 includes multiple physical filters, one for each conductor of bus 130. For example, in some embodiments, "n" is equal to 16, and bandpass filter 114 includes 16 physical bandpass filters with a pass-band characteristic that matches frequency pass-band 210 (FIG. 2). Also in these embodiments, bandpass filter 116 includes 16 physical bandpass filters with a pass-band characteristic that matches frequency pass-band 220 (FIG. 2); bandpass filter 118 includes 16 physical bandpass filters with a pass-band characteristic that matches frequency pass-band 230 (FIG. 2); and bandpass filter 120 includes 16 physical bandpass filters with a pass-band characteristic that matches frequency pass-band 240 (FIG. 2).

Local oscillator unit 104 provides local oscillator signals to memory system 110. Each memory device within memory system 110 receives one local oscillator signal, whereas controller 112 receives all of the local oscillator signals. For example, memory device 122 receives a local oscillator signal on node 132, memory device 124 receives a local oscillator signal on node 134, memory device 126 receives a local oscillator signal on node 136, and memory device 128 receives a local oscillator signal on node 138.

Each local oscillator signal corresponds to one of the frequency pass-bands shown in FIG. 2. Memory devices, bandpass filters, and local oscillator signals that correspond to the same frequency pass-band are labeled with common subscripts in FIGS. 1–4. For example, the local oscillator signal on node 132, memory device 122, bandpass filter 114, and frequency pass-band 210 (FIG. 2), are all subscripted with zero. Likewise, other common local oscillator signals, memory devices, bandpass signals, and frequency pass-bands are subscripted with one through three.

Each local oscillator signal provides a carrier signal at a frequency suitable to translate data signals to the appropriate frequency pass-band as described above. For example, because memory device 122 and controller 112 communicate using frequency pass-band 210 (FIG. 2), they both receive local oscillator signal $LO_0$ on node 132. Controller 112 receives local oscillator signals at each frequency so that it can simultaneously communicate in each frequency pass-band. Memory devices 122, 124, 126, and 128 each receive one local oscillator signal to facilitate simultaneous communications with controller 112 in separate frequency pass-bands.

Memory system 110 is shown having four memory devices communicating using four different frequency pass-bands. In some embodiments, other than four memory devices are included. For example, in some embodiments, less than four memory devices are used, and in other embodiments, more than four memory devices are used. In other embodiments, each memory device as shown in FIG. 1 represents multiple physical memory devices, or a "bank" of memory. In these embodiments, memory system 110 is divided into a number of banks, each bank including a plurality of memory devices, and each bank is assigned a frequency pass-band within which to communicate.

In some embodiments, bandpass filters 114, 116, 118, and 120 are constructed using traces on a circuit board. For example, filters can be created on a circuit board using micro-strip or strip-line techniques. In some of these embodiments, memory system 110 is packaged as a multi-chip module (MCM), and the MCM includes bandpass filters constructed in the substrate between the memory devices and the controller. In other embodiments, filters are constructed using lumped elements on the circuit board.

In embodiments represented by FIG. 1, local oscillator unit 104 is part of system 100, but is not part of memory system 110. In other embodiments, local oscillator unit 104 is part of the memory system. For example, in some embodiments, the memory system includes the controller, bandpass filters, memory devices, and the local oscillator unit. In other embodiments, the memory system includes the bandpass filters, the memory devices, the local oscillator unit, and not the controller. Any combination of devices can be included within memory system 110 without departing from the scope of the present invention.

In some embodiments, memory devices 122, 124, 126, and 128 do not receive local oscillator signals from local oscillator unit 104. In these embodiments, each memory device recovers the carrier frequency from received data. For example, memory device 122 can recover the frequency of $LO_0$, and apply that frequency when transmitting data on bus 130. Many embodiments of the present invention exist having various local oscillator configurations.

In some embodiments, controller 112 is a memory controller that satisfies requests by processor 102 to retrieve and store data. In other embodiments, controller 112 is a frequency controller that provides limited functionality, if any, beyond frequency translation for simultaneous communications with memory devices.

Processor 102 can include any processor suitable for communicating with memory system 110. For example, processor 102 can be a microprocessor, a digital signal processor, a microcontroller, or the like.

Figure 3A:
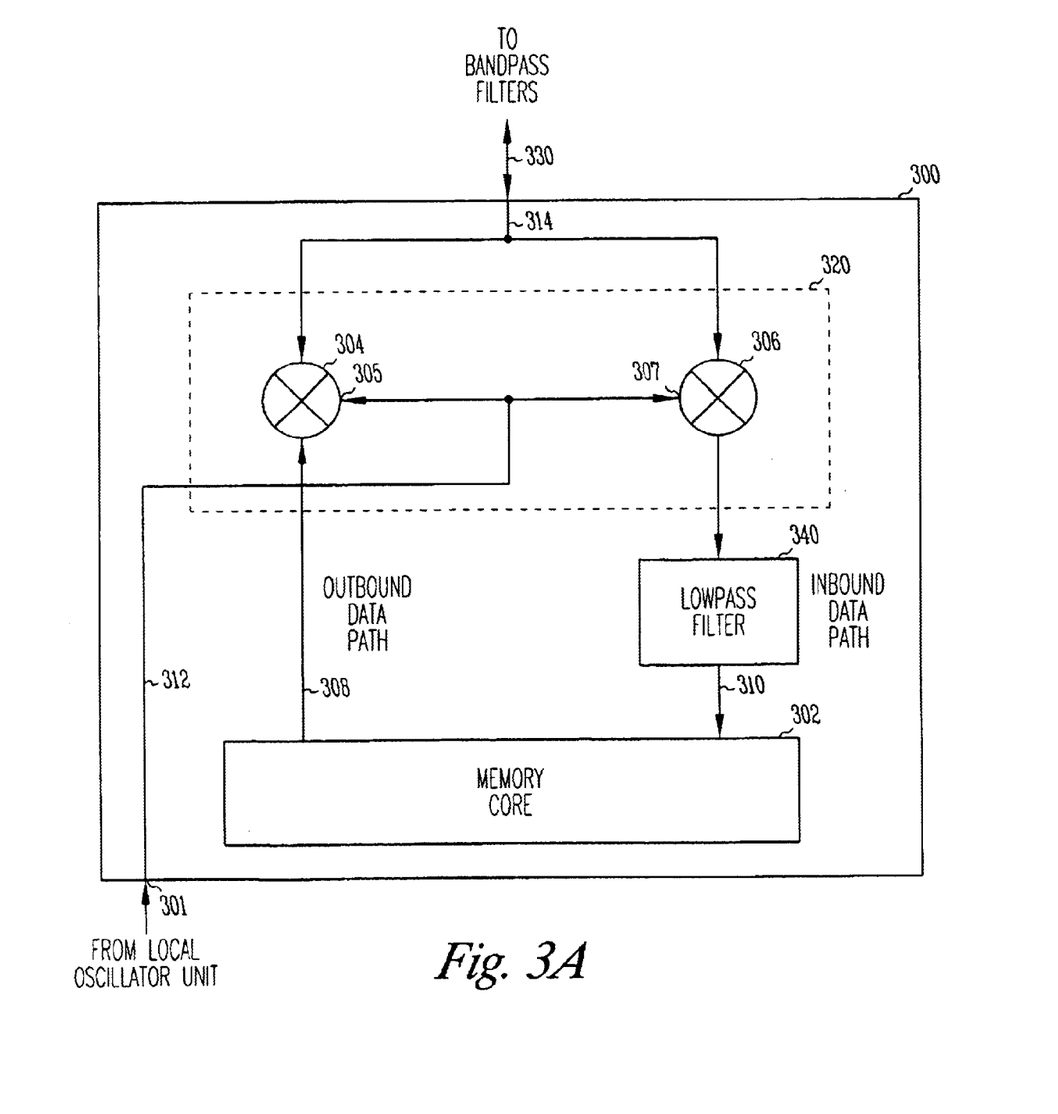
FIGS. 3A and 3B show memory devices suitable for use with the electronic system of FIG. 1.
Figure 3B:
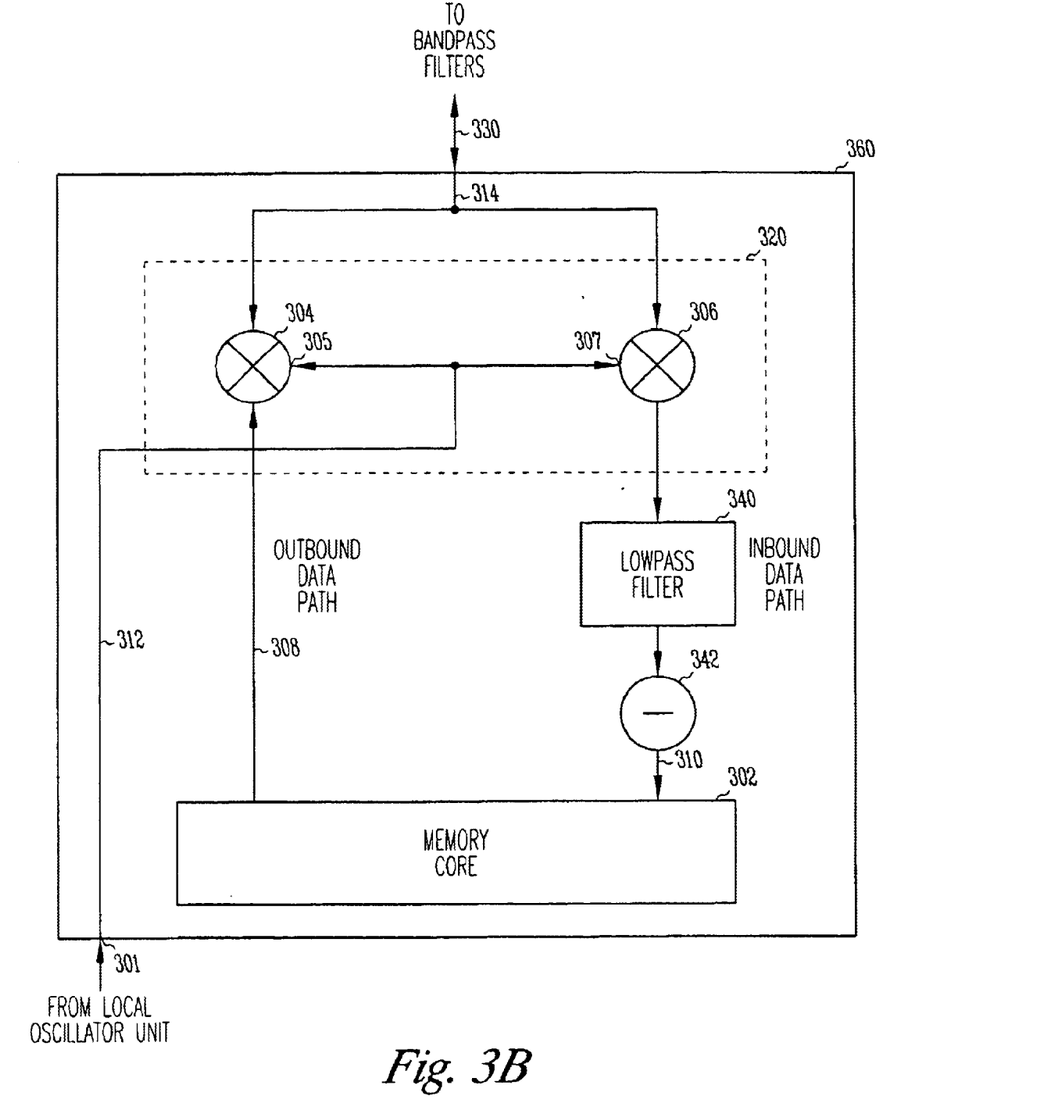

FIGS. 3A and 3B show memory devices suitable for use with the electronic system of FIG. 1. Referring now to FIG. 3A, memory device 300 includes memory core 302, lowpass filter 340, and frequency translation circuitry 320. Frequency translation circuitry 320 includes frequency translators 304 and 306. Frequency translators 304 and 306 can be any devices capable of translating a signal from one frequency to another. In some embodiments, frequency translators 304 and 306 utilize diode-ring mixers. Any other circuit suitable to translate the frequency of signals can be substituted for frequency translators 304 and 306 without departing from the scope of the present invention.

Memory device 300 is coupled to bus 330, which corresponds to the data path between memory devices and bandpass filters shown in FIG. 1. Memory device 300 also includes local oscillator input terminal 301, at which a local oscillator signal is received and provided to internal circuitry on node 312.

Memory core 302 includes memory storage apparatus suitable to store information useful to system 100 (FIG. 1). For example, memory core 302 can include read only memory (ROM) of various types, including but not limited to programmable read only memory (PROM), erasable programmable memory (EPROM), and electrically erasable programmable read only memory (EEPROM). Also for example, memory core 302 can include random access memory (RAM) of various types including but not limited to dynamic random access memory (DRAM), static random access memory (SRAM), and synchronous dynamic random access memory (SDRAM). In other embodiments, memory core 302 includes floating-gate erasable memory devices, also known as "FLASH" memory. In general, any type of memory storage apparatus can be included in memory core 302 without departing from the scope of the present invention. In addition to memory storage apparatus, in some embodiments, memory core 302 includes modulation and detection circuitry, as discussed below.

FIG. 3A shows memory core 302 with an inbound data path and an outbound data path. The inbound data path includes node 314, frequency translator 306, lowpass filter 340, and node 310. The outbound data path includes node 308, frequency translator 304, and node 314. In some embodiments, the inbound data path includes control signals as well as data signals. In these embodiments, both inbound data signals and control signals are received by memory device 300 in the frequency pass-band assigned to memory device 300. In other embodiments, the inbound data path includes data signals but does not include control signals. In these embodiments, inbound data signals are received in the frequency pass-band assigned to memory device 300, but the control signals are not. Also in these embodiments, control signals are received by memory device 300 on a path (not shown) other than the inbound data path. As used in this description, the term "control signals" refers to any signal other than data signals. For example, control signals can include chip select, write enable, and clock signals.

In operation, memory device 300 transmits and receives data on node 314. The data is contained in a signal in a frequency pass-band as described above with reference to FIGS. 1 and 2. When memory device 300 is receiving data, frequency translator 306 receives a data signal on node 314. Frequency translator 306 also receives a local oscillator signal from node 312 at local oscillator input port 307. The data signal is down-converted by frequency translator 306 such that signals on node 310 are at a lower frequency. In some embodiments, signals on node 310 are at "baseband" such that logic levels are present that represent digital signals. In other embodiments, signals on node 310 are at a frequency below that of node 314, but still above baseband. In these embodiments, detectors within memory core 302 detect the digital data from the signals on node 310.

Besides being transmitted and received in an assigned frequency pass-band, signals on node 314 can be modulated using any appropriate modulation scheme. For example, digital signals can be modulated using bi-phase modulation at a single carrier frequency, or can be frequency modulated such that digital logic levels are represented by different frequencies within the frequency pass-band assigned to the memory device. In other embodiments, multiple data bits can be grouped into symbols, and appropriate modulation schemes can be employed. Example modulation schemes include m-ary phase modulation, and a combination of phase and amplitude modulation. Many other modulation schemes are possible, and are intended to be within the scope of the present invention. Different modulation schemes generally use different types of detectors. Detectors are not explicitly shown in FIG. 3A. In embodiments that utilize detectors, detectors are included within frequency translation circuitry 320 or within memory core 302.

When memory device 300 is transmitting data, memory core 302 drives node 308 with outbound data. Frequency translator 304 receives the outbound data and also receives the local oscillator signal from node 312 at local oscillator input port 305. Frequency translator 304 translates the frequency of the outbound data signal to be within the frequency pass-band assigned to memory device 300 as described above with reference to FIGS. 1 and 2.

In some embodiments, frequency translation circuitry 320 includes modulating circuitry to modulate the data onto a signal prior to up-converting the signal to the assigned frequency pass-band. Also in some embodiments, the outbound data path of frequency translation circuitry 320 includes additional circuitry to present a high impedance to node 314 when memory device 300 is not transmitting data.

FIG. 3A shows one node 308 and one node 310 for clarity; however, nodes 308 and 310 each have "n" physical nodes, or "bit lines," corresponding to the "n" nodes shown in FIG. 1. Also for clarity, frequency translation circuitry 320 shows one frequency translator in the inbound data path and one frequency translator in the outbound data path. In practice, frequency translator 306 includes "n" frequency translators, each being coupled to receive one of the "n" signals on node 314, and each also being coupled to receive the local oscillator signal on node 312. In addition, frequency translator 304 includes "n" frequency translators, each being coupled to receive one of the "n" signals on node 308, and each also being coupled to receive the local oscillator signal on node 312. Further, FIG. 3A shows a single lowpass filter 340 for clarity, whereas in practice, "n" lowpass filters are included in memory device 300.

The local oscillator signal received from the local oscillator unit determines the frequency pass-band within which memory device 300 operates. For example, if $LO_0$ (FIG. 1) is received at local oscillator input terminal 301, memory device 300 communicates using pass-band 210 (FIG. 2). The bandpass filters outside memory device 300 also have a pass-band characteristic that corresponds to the local oscillator signal received. In other embodiments, memory device 300 includes carrier recovery circuitry (not shown) to recover the carrier frequency of the inbound signals on node 314, and this carrier frequency is utilized to up-convert the outbound data.

In embodiments represented by FIG. 3A, bandpass filters are included outside memory device 300. In other embodiments, bandpass filters are included inside memory device 300. In these embodiments, the bandpass filters either have a programmable pass-band characteristic, or the memory device is dedicated to a particular frequency pass-band.

Embodiments represented by FIG. 3A are suitable for time-multiplexed bidirectional communications. The outbound data and inbound data share the same spectrum on node 314, and memory device 300 does not simultaneously communicate outbound and inbound data. In contrast, FIG. 3B shows a memory device suitable for simultaneous bidirectional communication. FIG. 3B shows memory device 360 which includes many elements in common with memory device 300 (FIG. 3A), and also includes subtractor 342. Subtractor 342 subtracts outbound data on node 308 from signals down-converted in the inbound data path to generate the inbound data on node 310. When memory device 360 simultaneously communicates both outbound and inbound data, the outbound and inbound data combine at the pass-band frequency on node 314. Subtractor 342 subtracts the outbound data from the combined signal to provide the proper inbound data to memory core 302.

Figure 4:
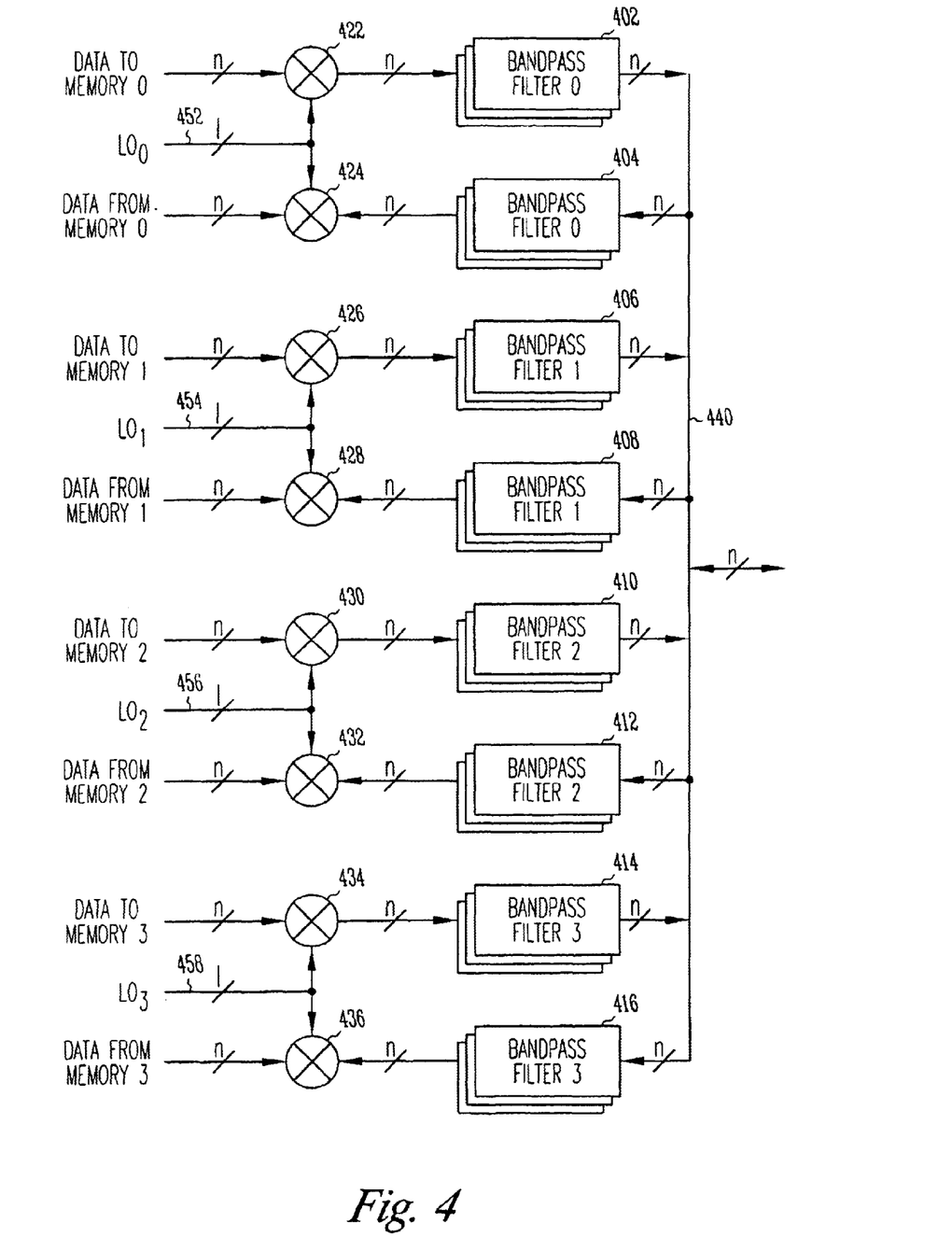
FIG. 4 shows a portion of a controller suitable for use with the electronic system of FIG. 1.

FIG. 4 shows a portion of a controller suitable for use with the electronic system of FIG. 1. The portion shown is the interface circuitry that supports memory pass-band signaling between the controller and memory devices. The remaining controller circuitry is omitted from FIG. 4. The omitted portions were not included in FIG. 4 so as to more clearly show the portion that supports memory pass-band signaling.

Controller 400 allows simultaneous communications with multiple memory devices by communicating with each using a different frequency pass-band. Local oscillator signals are received by controller 400 to up-convert and down-convert signals to and from the different frequency pass-bands. These local oscillator signals correspond to those shown in FIG. 1.

In some embodiments, frequency translation circuitry and bandpass filters are provided to effect the frequency translation and filtering. Bandpass filters 402, 404, 406, 408, 410, 412, 414, and 416 each communicate with a corresponding frequency translation device and also communicate with node 440. For example, bandpass filter 402 is coupled to node 440, and is also coupled to frequency translation device 422; and bandpass filter 404 is coupled to node 440, and is also coupled to frequency translation device 424.

Frequency translation device 422 receives data from the controller that is to be sent to memory device zero (shown in FIG. 1 as memory device 122). Frequency translation device 422 also receives a local oscillator signal on node 452. As a result, the data is up-converted by frequency translation device 422 to frequency pass-band 210 (FIG. 2). Bandpass filter 402 filters the up-converted signal and provides it to node 440. The above description of frequency translation device 422 and bandpass filter 402 also applies to frequency translation devices 426, 430, and 434; and bandpass filters 406, 410, and 414; except that each frequency translation device and bandpass filter communicate with a different memory device in a different frequency pass-band.

Frequency translation device 424 receives a signal in frequency pass-band 210 (FIG. 2) from bandpass filter 404 that originated from memory device 0 (shown in FIG. 1 as memory device 122). Frequency translation device 424 also receives the local oscillator signal on node 452. As a result, the signal is down-converted by frequency translation device 424 from frequency pass-band 210 (FIG. 2). The above description of frequency translation device 424 and bandpass filter 404 also applies to the frequency translation devices 428, 432, and 436; and bandpass filters 408, 412, and 416; except that each frequency translation device and bandpass filter communicate with a different memory device in a different frequency passband. Local oscillator signals are shown on nodes 452, 454, 456, and 458.

Embodiments represented by FIG. 4 have two bandpass filters for each pass-band frequency, one for outbound data and one for inbound data. For example, bandpass filters 402 and 404 are two bandpass filters with the same pass-band frequency. In some embodiments, one bandpass filter is used for both inbound and outbound data. For example, in some embodiments, bandpass filter 404 is omitted, and bandpass filter 402 is coupled to both frequency translation devices 422 and 424.

Each node shown in FIG. 4 that includes data to or from a memory device is made up of "n" physical nodes, such that "n" lines of bidirectional communication are available between controller 400 and each memory device. In addition, each bandpass filter and frequency translation device includes "n" such devices, one for each of the "n" physical nodes. In some embodiments, the data signals shown in FIG. 4 include control signals as discussed above with reference to FIGS. 3A and 3B.

As discussed above with reference to FIG. 3A, some embodiments include circuitry to modulate data and control signals using various modulation schemes. In these embodiments, controller 400 includes modulation circuitry to modulate the data prior to up-conversion in frequency, and also includes detection circuitry to detect data after down-conversion in frequency.

Figure 5:
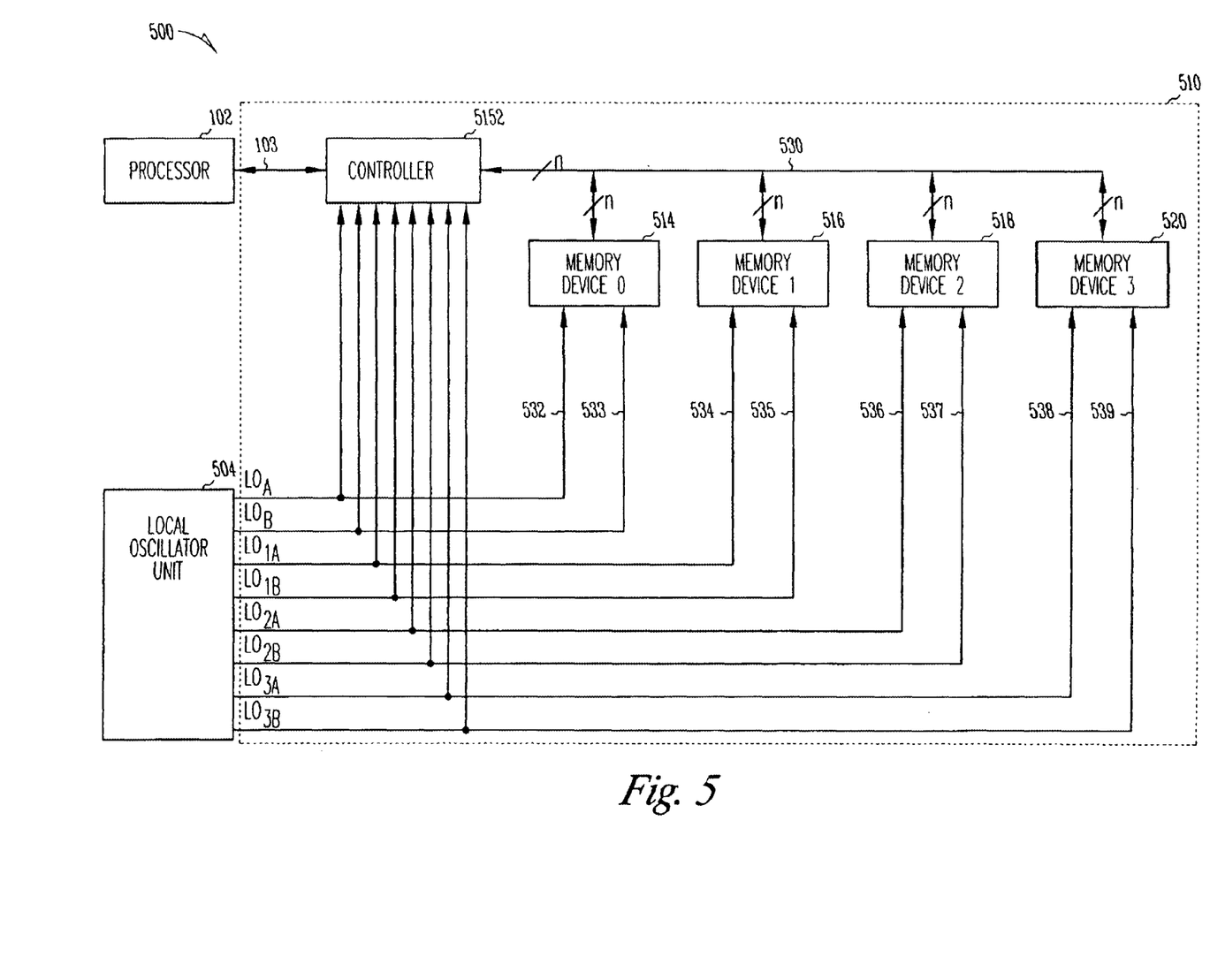
FIG. 5 shows another electronic system with memory pass-band signaling.

FIG. 5 shows another electronic system with memory pass-band signaling. System 500 includes processor 102, local oscillator unit 504, and memory system 510. Processor 102 communicates with memory system 510 on bus 530, and local oscillator unit provides local oscillator signals to memory system 510 on nodes 532–539.

Memory system 510 includes controller 512, and memory devices 514, 516, 518, and 520. Controller 512 communicates with each memory device using bus 530. Bus 530 is shown as "n" bits wide to indicate that any number of conductors can be utilized to provide a communication path between controller 512 and memory devices 514, 516, 518, and 520.

Each memory device can simultaneously communicate with controller 512 in both directions. This is accomplished in part by each memory device sending and receiving data in different frequency pass-bands. This memory pass-band signaling scheme is different from that described with reference to FIG. 1 where each memory could simultaneously communicate, but not in both directions. For example, referring now to FIG. 6, frequency pass-band 602 is used for communications from controller 512 to memory device 514, and frequency pass-band 604 is used for communications from memory device 514 to controller 512. In a similar manner, frequency pass-bands 606 and 608 are used for communications between controller 512 and memory device 516; frequency pass-bands 610 and 612 are used for communications between controller 512 and memory device 518; and frequency pass-bands 614 and 616 are used for communications between controller 512 and memory device 520. By utilizing pass-band signaling, bus 530 can be simultaneously used for bidirectional communications between controller 512 and each of the memory devices.

Referring now back to FIG. 5, local oscillator unit 504 provides local oscillator signals to memory system 510. Each memory device within memory system 510 receives two local oscillator signals, whereas controller 512 receives all of the local oscillator signals. For example, memory device 514 receives local oscillator signals on nodes 532 and 533, memory device 516 receives local oscillator signals on nodes 534 and 535, memory device 518 receives local oscillator signals on nodes 536 and 537, and memory device 520 receives local oscillator signals on nodes 538 and 539.

Figure 6:
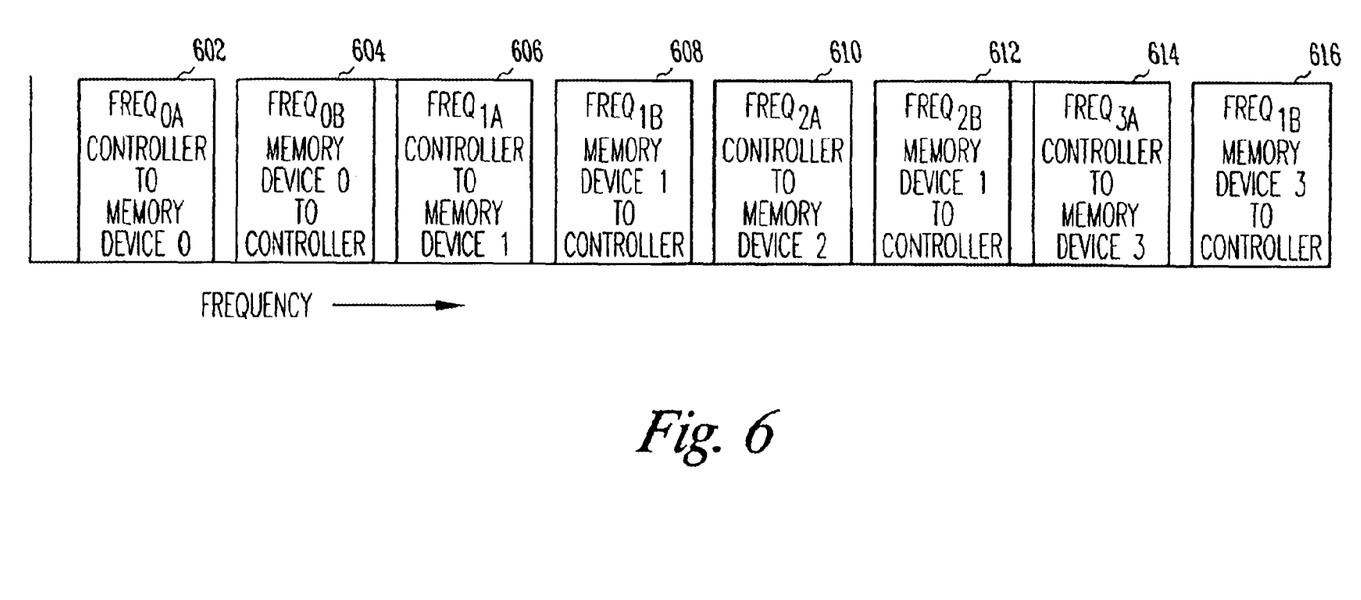
FIG. 6 shows frequency pass-band assignments for the electronic system of FIG. 5.

Each local oscillator signal corresponds to one of the frequency pass-bands shown in FIG. 6. Memory devices, bandpass filters, and local oscillator signals that correspond to the same frequency pass-band are labeled with common subscripts in FIGS. 5–8. The subscripts used to label local oscillator signals, bandpass filters, and frequency pass-bands include a number to designate a memory device, and also include either the letter "A" or "B" to designate the direction of the communication. For example, the local oscillator signal on node 532 includes the subscript "0A." The "0" designates memory device zero (memory device 514, FIG. 5), and the "A" designates communication from the controller to the memory device. In a similar manner, the subscript "B" designates communications from the memory device to the controller.

Each local oscillator signal provides a carrier signal at a frequency suitable to up-convert lower frequency signals to the appropriate pass-band or to down-convert signals from the appropriate pass-band to a lower frequency signal. For example, because memory device 532 and controller 512 communicate using frequency pass-bands 602 and 604 (FIG. 6), they both receive local oscillator signals $LO_{0A}$ and $LO_{0B}$ on nodes 532 and 533, respectively. Controller 512 receives local oscillator signals at each frequency so that it can simultaneously communicate in each frequency pass-band. Memory devices 514, 516, 518, and 520 each receive two local oscillator signals to facilitate simultaneous bidirectional communications with controller 512 in separate frequency pass-bands.

Memory system 510 is shown having four memory devices communicating using eight different frequency pass-bands. In some embodiments, other than four memory devices are included. For example, in some embodiments, less than four memory devices are used, and in other embodiments, more than four memory devices are used. In other embodiments, each memory device as shown in FIG. 5 represents multiple physical memory devices, or a "bank" of memory. In these embodiments, memory system 510 is divided into a number of banks, each bank including a plurality of memory devices, and each bank is assigned two frequency pass-bands within which to communicate.

Figure 7:
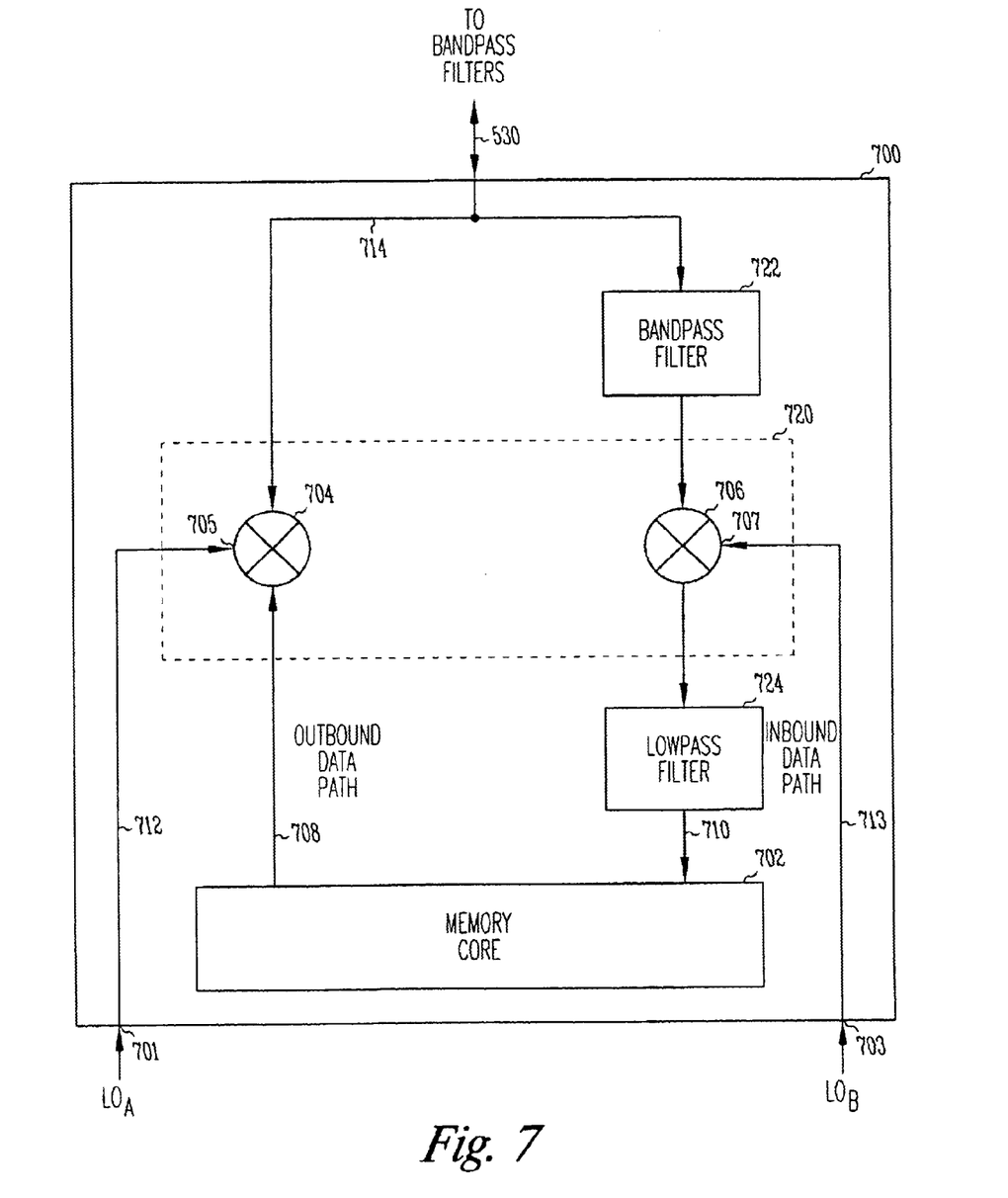
FIG. 7 shows a memory device suitable for use with the electronic system of FIG. 5.

FIG. 7 shows a memory device suitable for use with the electronic system of FIG. 5. Memory device 700 includes memory core 702 and frequency translation circuitry 720. Frequency translation circuitry 720 includes frequency translators 704 and 706. Frequency translators 704 and 706 can be any devices capable of translating a signal from one frequency to another. In some embodiments, frequency translators 704 and 706 utilize diode-ring mixers. Any other circuit suitable to translate the frequency of signals can be substituted for frequency translators 704 and 706 without departing from the scope of the present invention.

Memory device 700 is coupled to bus 530, which corresponds to the data path between memory devices and controller shown in FIG. 5. Memory device 700 also includes local oscillator input terminals 701 and 703, at which local oscillator signals are received and provided to internal circuitry on nodes 712 and 713, respectively.

Memory core 702 includes memory storage apparatus suitable to store information useful to system 500 (FIG. 5). For example, memory core 702 can include read only memory (ROM) of various types, including but not limited to programmable read only memory (PROM), erasable programmable memory (EPROM), and electrically erasable programmable read only memory (EEPROM). Also for example, memory core 702 can include random access memory (RAM) of various types including but not limited to dynamic random access memory (DRAM), static random access memory (SRAM), and synchronous dynamic random access memory (SDRAM). In other embodiments, memory core 702 includes floating-gate erasable memory devices, also known as "FLASH" memory. In general, any type of memory storage apparatus can be included in memory core 702 without departing from the scope of the present invention. In addition to memory storage apparatus, memory core 702 can include other circuits, including but not limited to modulators and detectors.

FIG. 7 shows memory core 702 with an inbound data path and an outbound data path. The inbound data path includes node 714, bandpass filter 722, frequency translator 706, lowpass filter 724, and node 710. The outbound data path includes node 708, frequency translator 704, and node 714. In some embodiments, the inbound data path includes control signals as well as data signals. In these embodiments, both inbound data signals and control signals are received in the frequency pass-band assigned to the inbound data path of memory device 700. In other embodiments, the inbound data path includes data signals but does not include control signals. In these embodiments, inbound data signals are received in the frequency pass-band assigned to the inbound data path of memory device 700, but the control signals are not. Also in these embodiments, control signals are received by memory device 700 on a path (not shown) other than the inbound data path.

In operation, memory device 700 transmits and receives data at different pass-band frequencies on node 714. The data is contained in a signal in a frequency pass-band as described above with reference to FIGS. 5 and 6. When memory device 700 is receiving data, bandpass filter 722 filters the signals present on node 714, and delivers the appropriate frequency pass-band to frequency translator 706. Frequency translator 706 also receives a local oscillator signal from node 713 at local oscillator input port 707. The data is down-converted by frequency translator 706 and filtered by lowpass filter 724 such that signals on node 710 are at a lower frequency. In some embodiments, signals on node 710 are at "baseband" such that logic levels are present that represent digital signals. In other embodiments, signals on node 710 are at a frequency below that of node 714, but still above baseband. In these embodiments, detectors within memory core 702 detect the digital data from the signals on node 710.

Besides being transmitted and received in a selected frequency pass-band, signals on node 714 can be modulated using any appropriate modulation scheme. For example, digital signals can be modulated using bi-phase modulation at a single carrier frequency, or can be frequency modulated such that digital logic levels are represented by different frequencies within the frequency pass-band assigned to the memory device. In other embodiments, multiple data bits can be grouped into symbols, and appropriate modulation schemes can be employed. Example modulation schemes include m-ary phase modulation, and a combination of phase and amplitude modulation. Many other modulation schemes are possible, and are intended to be within the scope of the present invention. Different modulation schemes generally use different types of detectors. Detectors are not explicitly shown in FIG. 7. In embodiments that utilize detectors, detectors are included within frequency translation circuitry 720 or within memory core 702.

When memory device 700 is transmitting data, memory core 702 drives node 708 with outbound data. Frequency translator 704 receives the outbound data and also receives the local oscillator signal from node 712 at local oscillator input port 705. Frequency translator 704 translates the frequency of the outbound data signal to be within the frequency pass-band assigned to the outbound data path of memory device 700 as described above with reference to FIGS. 5 and 6.

In some embodiments, frequency translation circuitry 720 includes modulating circuitry to modulate the data onto a signal prior to up-converting the signal to the assigned frequency pass-band. Also in some embodiments, the outbound data path of frequency translation circuitry 720 includes additional circuitry to present a high impedance to node 714 when memory device 700 is not transmitting data.

FIG. 7 shows one node 708 and one node 710 for clarity; however, nodes 708 and 710 each have "n" physical nodes, or "bit lines," corresponding to the "n" nodes shown in FIG. 5. Also for clarity, one bandpass filter 722 is shown, one lowpass filter 724 is shown, and frequency translation circuitry 720 shows one frequency translator in the inbound data path and one frequency translator in the outbound data path. In practice, "n" bandpass filters are coupled to node 714, and frequency translator 706 includes "n" frequency translators, each being coupled to receive one of the "n" signals from the "n" bandpass filters. Each frequency translator corresponding to frequency translator 706 is also coupled to receive the local oscillator signal on node 713. Each of the "n" frequency translators 706 is also coupled to one of the "n" lowpass filters 724, which are coupled to memory core 702. In addition, frequency translator 704 includes "n" frequency translators, each being coupled to receive one of the "n" signals on node 708, and each also being coupled to receive the local oscillator signal on node 712.

The local oscillator signals received from the local oscillator unit determine the frequency pass-bands within which memory device 300 operates. For example, if $LO_{OA}$ (FIG. 5) is received on node 712, memory device 700 communicates outbound data using pass-band 602 (FIG. 6). Also for example, if $LO_{OB}$ (FIG. 5) is received on node 713, memory device 700 receives inbound data using pass-band 604 (FIG. 6).

Figure 8:
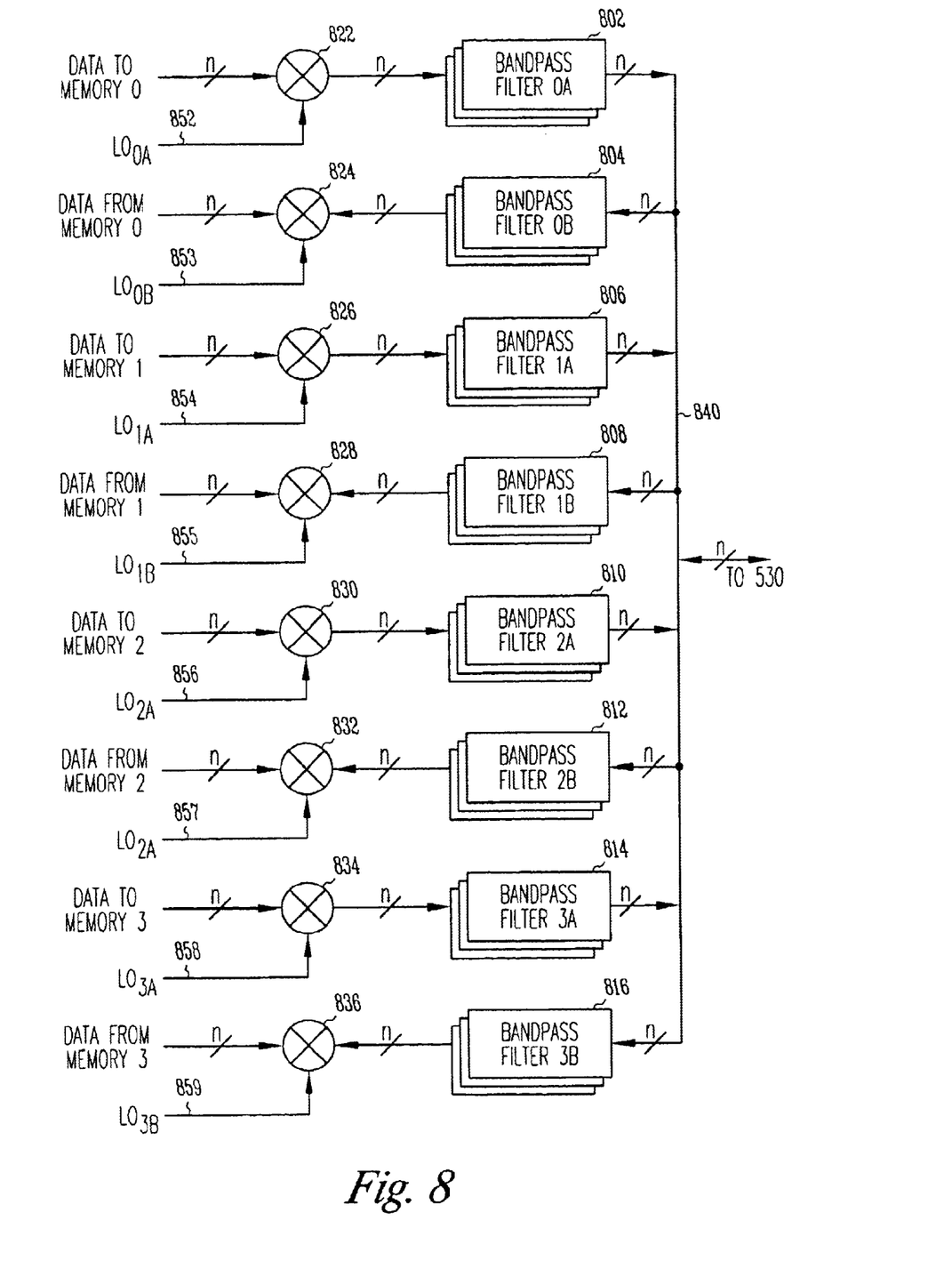
FIG. 8 shows a portion of a controller suitable for use with the electronic system of FIG. 5.

FIG. 8 shows a portion of a controller suitable for use with the electronic system of FIG. 5. The portion shown is the interface circuitry that supports memory pass-band signaling between the controller and memory devices. The remaining controller circuitry is omitted from FIG. 8. The omitted portions were not included in FIG. 8 so as to more clearly show the portion that supports memory pass-band signaling.

Controller 800 allows simultaneous bidirectional communications with multiple memory devices by communicating with each using different frequency pass-bands for both transmit and receive. Local oscillator signals are received by controller 800 to up-convert and down-convert signals to and from the different frequency pass-bands. These local oscillator signals correspond to those shown in FIG. 5.

Frequency translation devices and bandpass filters are provided to effect the frequency translation and filtering. Bandpass filters 802, 804, 806, 808, 810, 812, 814, and 816 each communicate with a corresponding frequency translation device and also communicate with node 840. For example, bandpass filter 802 is coupled to node 840, and is also coupled to frequency translation device 822; and bandpass filter 804 is coupled to node 840, and is also coupled to frequency translation device 824.

Frequency translation device 822 receives data from the controller that is to be sent to memory device zero (shown in FIG. 5 as memory device 514). Frequency translation device 822 also receives a local oscillator signal on node 852. As a result, the data is up-converted by frequency translation device 822 to frequency pass-band 602 (FIG. 6). Bandpass filter 802 filters the up-converted signal and provides it to node 840. The above description of frequency translation device 822 and bandpass filter 802 also applies to frequency translation devices 826, 830, and 834; and bandpass filters 806, 810, and 814; except that each frequency translation device and bandpass filter communicate with a different memory device at a different frequency.

Frequency translation device 824 receives a signal in frequency pass-band 604 (FIG. 6) from bandpass filter 804 that originated from memory device zero (shown in FIG. 5 as memory device 514). Frequency translation device 824 also receives a local oscillator signal on node 853. As a result, the signal is down-converted by frequency translation device 824 from frequency pass-band 604 (FIG. 6). The above description of frequency translation device 824 and bandpass filter 804 also applies to the frequency translation devices 828, 832, and 836; and bandpass filters 808, 812, and 816; except that each frequency translation device and bandpass filter communicate with a different memory device at a different frequency. Local oscillator signals are shown on nodes 852-859.

Each node shown in FIG. 8 that includes data to or from a memory device is made up of "n" physical nodes, such that "n" lines of bidirectional communication are available between controller 800 and each memory device. In addition, each bandpass filter and frequency translation device includes "n" such devices, one for each of the "n" physical nodes. In some embodiments, the data signals shown in FIG. 8 include control signals as discussed above with reference to FIG. 7.

As discussed above with reference to FIG. 7, some embodiments include circuitry to modulate data and control signals using various modulation schemes. In these embodiments, controller 800 includes modulation circuitry to modulate the data prior to up-conversion in frequency, and also includes detection circuitry to detect data after down-conversion in frequency.

Figure 9:
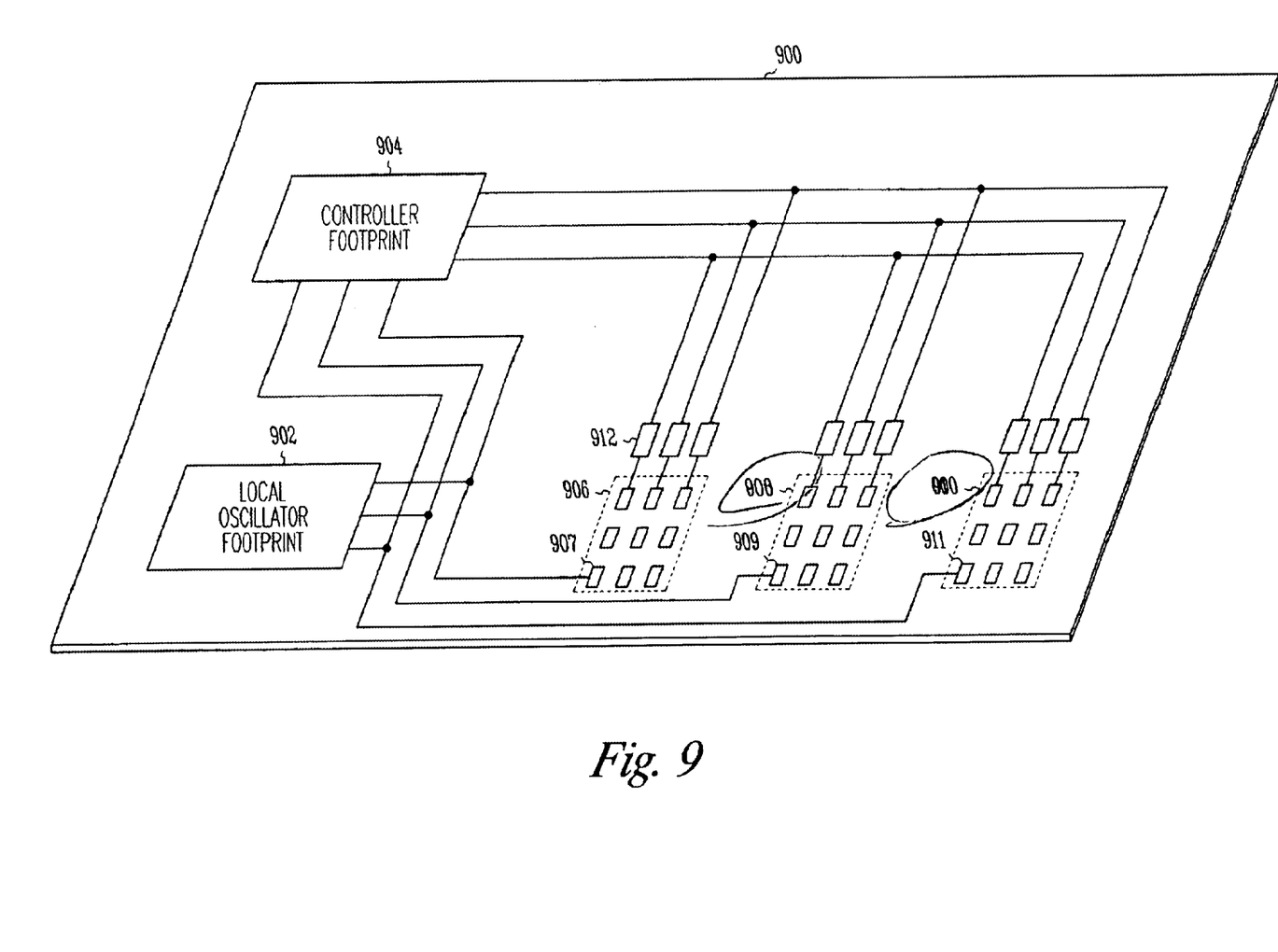
FIG. 9 is a perspective view of a memory system substrate.

FIG. 9 is a perspective view of a memory system substrate. Substrate 900 includes memory device footprints, a local oscillator unit footprint, and a controller footprint. Footprints 906, 908, and 910 are footprints to accept memory devices such as those shown in FIGS. 1, 3, 5, and 7. Footprint 904 is a footprint to accept a controller such as controller 112 (FIG. 1) or controller 512 (FIG. 5). And footprint 902 is a footprint to accept a local oscillator unit such as local oscillator unit 104 (FIG. 1) or local oscillator unit 504 (FIG. 5). In some embodiments local oscillator unit footprint 902 is a connector to receive a mating connector with local oscillator signals.

Substrate 900 can be any material suitable to have memory devices mechanically and electrically affixed, and to provide electrical conductors, or "traces" between the various devices. In some embodiments, substrate 900 includes inorganic material such as ceramic or silicon. In other embodiments, substrate 900 includes organic material such as glass epoxy commonly used in printed circuit boards. Some of these embodiments also include metal layers within which traces are formed. In some embodiments, substrate 900 is an organic land grid array (OLGA) package substrate. In some embodiments, the underside of substrate 900 includes contact points to make electrical contact to a different circuit board. In other embodiments, substrate 900 is part of a package that accepts unpackaged memory die and controller die.

Footprints 906, 908, and 910 include pads to accept electrical connections from memory devices when they are affixed. For example, pads 907, 909, and 911 are "memory device pads" that accept electrical connections from the memory devices. Each of pads 907, 909, and 911 are connected to traces on substrate 900 that are also connected to pads for the local oscillator unit. These traces are "local oscillator signal traces" that provide local oscillator signals to the memory devices. The local oscillator signal provided to any particular memory device is a function of the particular footprint to which the memory device is affixed.

Substrate 900 also includes bandpass filters in the signal traces between the controller footprint and the memory device footprints. For example, bandpass filters 912 are coupled in the signal traces between memory device footprint 906 and controller footprint 904. In some embodiments, the bandpass filters are manufactured using the geometry of the traces on substrate 900. For example, the pass-band frequency can be set using transmission line filter techniques. In some embodiments, each footprint has different bandpass filters coupled to the memory device pads. This corresponds to different memory devices being coupled to bandpass filters having different frequency pass-bands (see FIG. 1).

As previously described, the local oscillator signal provided to any particular memory device is a function of the footprint to which the device is affixed. The bandpass filters are also a function of the footprint. As a result, the frequency pass-band assignment is made as a function of the position of the memory device on substrate 900. This configuration allows a memory device that can operate in any pass-band, such as memory device 300 or 360 (FIGS. 3A, 3B), to be affixed to any footprint, and to operate in the pass-band "assigned" to that footprint.

In some embodiments, the local oscillator unit footprint is a connector that accepts local oscillator signals from a source other than a local oscillator unit on substrate 900. In some of these embodiments, the local oscillator signals are generated at a different location and sent to the memory system through the connector.

Systems represented by the various foregoing figures can be of any type. Examples of represented systems include computers (e.g., desktops, laptops, handhelds, servers, Web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An electronic circuit comprising:
   a bandpass filter connected to receive data from a bus and produce an output signal in a predetermined pass band;
   a memory core having an inbound data path and an outbound data path;
   a first frequency translation circuit having an output thereof coupled to the inbound data path of the memory core, and having an input thereof coupled to receive the output signal from the bandpass filter; and
   a second frequency translation circuit coupled to the outbound data path of the memory core.

2. The device of claim 1 wherein:
   the memory device includes first and second local oscillator input terminals;
   the first frequency translation circuit includes a first local oscillator input port coupled to the first local oscillator input terminal of the memory device; and
   the second frequency translation circuit includes a second local oscillator input port coupled to the second local oscillator input terminal of the memory device.

3. The device of claim 2 wherein the first frequency translation circuit includes a mixer to translate the frequency of inbound signals.

4. The device of claim 3 wherein the second frequency translation circuit includes a mixer to translate the frequency of outbound signals.

5. The device of claim 1 wherein:
   the memory device includes a local oscillator input terminal;
   the first frequency translation circuit includes a first local oscillator input port coupled to the local oscillator input terminal of the memory device; and
   the second frequency translation circuit includes a second local oscillator input port coupled to the local oscillator input terminal of the memory device.

6. The device of claim 1 wherein:
   the inbound data path includes a first plurality of bit lines, and the first frequency translation circuit includes a mixer for each of the first plurality of bit lines; and
   the outbound data path includes a second plurality of bit lines, and the second frequency translation circuit includes a mixer for each of the second plurality of bit lines.

7. A memory system comprising:
   a controller having a plurality of frequency translation circuits coupled to conductors external to the controller to up-convert data signals to a plurality of pass-bands; and
   a plurality of memory devices coupled to the conductors external to the controller, each of the plurality of memory devices including frequency translation circuits to down-convert the data signals from at least one of the plurality of pass-bands.

8. The memory system of claim 7 further comprising a substrate to which the controller and plurality of memory devices are electrically and mechanically affixed.

9. The memory system of claim 8 further comprising a local oscillator unit affixed to the substrate and electrically coupled to the frequency translation circuits in the plurality of memory devices.

10. The system of claim 8 wherein the substrate includes signal traces to pass the data signals, the signal traces including at least one bandpass filter for each of the plurality of memory devices.

11. The memory system of claim 8 wherein the substrate includes a plurality of memory device footprints, each of the plurality of memory device footprints being coupled to a different local oscillator signal trace on the substrate.

12. A memory system comprising:
    a conductor;
    a memory device including a memory core and frequency translation circuitry coupled between the memory core and the conductor, and
    a controller including frequency translation circuitry coupled to the memory device through the conductor.

13. The memory system of claim 12 wherein the frequency translation circuitry of the controller includes a plurality of mixers.

14. The memory system of claim 13 further including a plurality of memory devices coupled to the conductor, of which the memory device is one.

15. The memory system of claim 14 further comprising a local oscillator unit coupled to each of the plurality of memory devices and to the controller.

16. The memory system of claim 14 wherein each of the plurality of memory devices is configured to receive one or more signals from a local oscillator unit.

17. The memory system of claim 14 wherein each of the plurality of memory devices is configured to receive at least one local oscillator signal, each of the at least one local oscillator signal being at different frequencies.

18. The memory system of claim 17 further comprising a substrate electrically and mechanically coupled to the plurality of memory devices and the controller.

19. The memory system of claim 18 wherein the substrate includes:
    a plurality of footprints to receive the plurality of memory devices; and
    a plurality of signal traces coupled to the plurality of memory devices such that a local oscillator signal provided to any particular memory device is a function of the footprint to which the particular memory device is affixed.

20. The memory system of claim 18 wherein the substrate includes a plurality of pass-band filters coupled to the conductor, one for each of the plurality of memory devices.

21. An electronic system comprising:
    a processor; and
    a memory system coupled to the processor, the memory system including a controller and a plurality of memory devices, each of the controller and the plurality of memory devices including frequency translation circuitry to allow each of the plurality of memory devices to simultaneously communicate with the controller.

22. The electronic system of claim 21 wherein the frequency translation circuits in the plurality of memory devices are configured to receive local oscillator signals.

23. The electronic system of claim 22 wherein each of the plurality of memory devices includes an inbound data path and an outbound data path, each path including frequency translation circuitry configured to receive separate local oscillator signals, such that inbound data is received at a first frequency and outbound data is transmitted at a second frequency.

24. The electronic system of claim 23 wherein each of the plurality of memory devices includes a bandpass filter coupled in the inbound data path.

25. The electronic system of claim 22 wherein each of the plurality of memory devices includes an inbound data path and an outbound data path, each path including frequency translation circuitry configured such that inbound data is received and outbound data is transmitted at substantially the same frequency.

26. The electronic system of claim 25 further including a substrate to which the plurality of memory devices are affixed, the substrate including signal traces having bandpass filter qualities.

27. The electronic system of claim 26 further including a local oscillator unit coupled to the substrate.

28. The electronic system of claim 27 wherein the substrate comprises a printed circuit board.

* * * * *